UNITED STATES PATENT OFFICE.

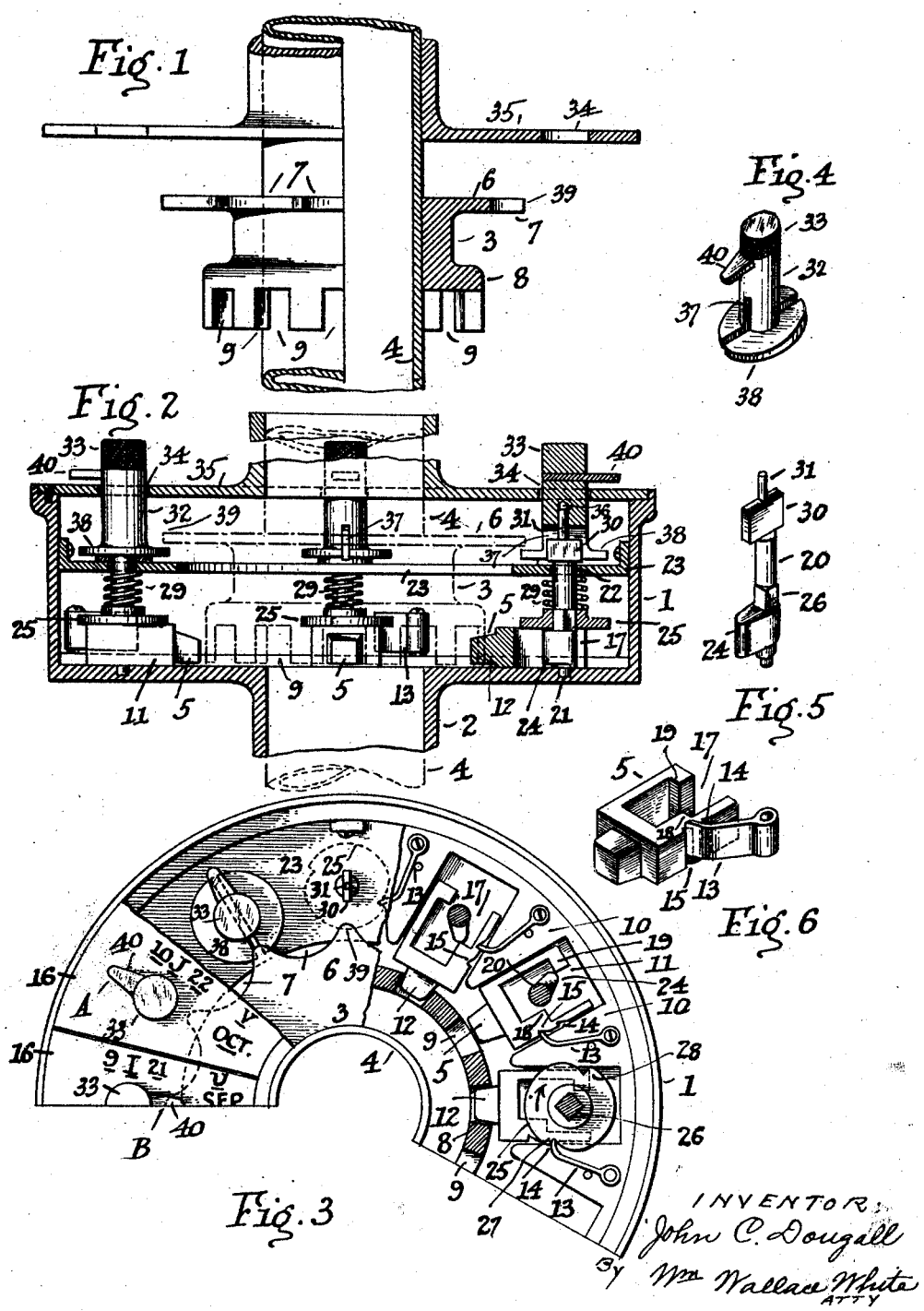

JOHN CUTHBERT DOUGALL, OF SOUTH MELBOURNE, VICTORIA, AUSTRALIA.

KEYLESS LOCKING MECHANISM.

1,372,490.　　　　Specification of Letters Patent.　　Patented Mar. 22, 1921.

Application filed December 27, 1919. Serial No. 347,795.

*To all whom it may concern:*

Be it known that I, JOHN CUTHBERT DOUGALL, a subject of the King of Great Britain and Ireland, etc., residing at South Melbourne, in the State of Victoria, Commonwealth of Australia, have invented certain new and useful Improvements in Keyless Locking Mechanism; and I do hereby declare the following to be a full, clear, and exact description of the invention, such as will enable others skilled in the art to which it appertains to make and use the same.

My invention covers keyless locking mechanism by which to fix and to release readily at will revoluble portions of mechanism, for example the steering post tube of a motor car, to prevent unauthorized running of the car.

With my mechanism on a car the user can adopt and use any bolt or any combination of bolts, of a series of bolts provided, so that any other person not knowing the combination would be baffled on attempting to use the car, unless the discovery of the combination were accidentally made, and no further complication occurred. The latter results would be extremely improbable.

Proper users of a motor car may use a combination agreed upon, but any such user could adopt a special combination which no other person need be informed of. Any user who knows what locking combination is in proper use, can reverse any additional locking effects which may have been produced by tampering with the mechanism. A tamperer could not lock the mechanism against a power to unlock of anyone entitled so to unlock.

In the following description, by way of example, the invention will be described as applied to the steering post tube of a motor car.

In the drawings herewith Figure 1 shows part of a steering post tube, inclosed by the cover of an outer casing, and by an inner casing. These parts are shown detached for clear illustration, but their working positions appear in Fig. 2. Fig. 2 shows the steering post tube dotted, and the said inner casing dotted, and shows the outer casing in vertical section, with some of its parts omitted for greater clearness of illustration. Fig. 3 is a partly sectional plan of part of the outer casing, with part of its cover removed, and with various interior parts in different positions for purpose of explanation. Figs. 4, 5, and 6 show various details in perspective.

1 is an outer casing, of which a part 2 is (at its base not shown) to be fixed to the car, and 3 is an inner part of the casing, which is to be fixed as by brazing to part of the steering post tube 4 which it incloses, and which together with the inner casing 3 is rotatable, except when casing 3 is fixed by means of one or more bolts of a series 5, carried by the outer casing.

Spaced around a flange 6 of the inner casing is an upper series of recesses 7, and spaced around another flange 8 of that casing is another series of recesses 9. These upper and lower recesses are equal in number but do not register with one another vertically.

Each series of recesses 7, 9, aforesaid may comprise any plurality, the larger the number the more complex the locking combination usable. The number of locking bolts 5, is one for each recess 9, and the bolts are slidable between guides 10 in casing 1.

Bolts shown at 11 are retracted from casing 3, and at 12 are projected, each entering a recess 9, and preventing rotation of casing 3 and tube 4. Any number of bolts may be projected at the same time.

Each projected bolt is held so by a member, as spring 13, the tip of which enters a bolt notch 14. There is another notch 15 to each bolt to receive the spring tip to keep the bolt unlocked when required.

The outer surface of casing 1 has divisions, 16, corresponding in number with the locking bolts, each division being marked with one or more symbols, for example the name of a month, one or more numbers and one or more letters, there being in any division more than one symbol of the same kind, if desired. Such symbols are illustrated underlined in Fig. 3.

These symbols allow of making a vast variety of locking combinations which will be easy to remember, yet hard to guess. When there are sixteen divisions, then in two rounds of the casing top 35 there may be conveniently marked all days of any month, and in less than two rounds all letters of the alphabet, and in less than one round all months of the year.

Each bolt 5 has a recess 17 having at one side a shoulder 18, and at the other a shoulder 19. Standing in the recess of each bolt is a spindle 20 having a lower bearing 21 in the casing under the bolt, and an upper bearing 22 in any convenient member of the casing, for example a fixed ring 23. Each spindle has a ward 24 which when the spindle is rotated part of a revolution will press shoulder 18, and thus project the bolt into a recess 9 to lock the parts 3, 4; but when the spindle is further rotated, the ward will press the shoulder 19 and will thus retract the bolt, and release the said locked parts. Each spindle has means to prevent backward rotation, as a cam or disk 25, having recesses 27, 28 at opposite sides to admit a part of spring 13—the shape of the recesses being such as to allow the bolt to be at any time rotated in the normal direction irrespective of the spring.

The part 26 of each spindle on which the disk is fitted is shown square, to prevent the disk rotating relatively to the spindle. To keep each disk 25 and its bolt 5 from rising out of place, pressure is maintained on them by a spring 29 the top of which abuts against ring 23. The spindle is shown in Fig. 5, and has a flattened upper part 30, and has an end pin 31. I fit on the parts 31, 30 of each spindle an adjustable member 32 shown in Fig. 4 having a head 33 which serves as a handle, and projects through a hole 34, in the cover 35 of casing 1, so that when the head 33 is rotated it will rotate the spindle it engages.

The lower part of each member 32 has a recess 36 to receive the spindle pin 31, and has a slot 37 into which fits part 30. The base of part 32 carries a flange 38 which (see Fig. 2) is below the level of the flange 6 of the inner casing.

When any bolt is locked none of the heads 33 can be raised, because the projections 39, between recesses 7 are then over flanges 38.

When the recesses 7 are so located as to allow parts 38 to be raised, that is when all the bolts are unlocked then any head 33 can be raised until its flange 38 is free from flat part 30.

As any bolt handle 33 can be rotated at any time a tamperer by rotating such handles might either lock or unlock bolts without knowing what he was doing.

To enable detection of tampering effects each head 33 has an indicator as 40, and each indicator will normally have a predetermined position—for example pointing outwardly as at A when all of the corresponding bolts are unlocked.

But I also arrange that when some of the bolts are locked the pointers will still be in the said normal positions A, but then no head 33 can be raised.

If now a tamperer being unable to raise a head of an unlocked bolt rotates it so that its pointer takes another position B, he locks the bolt, but that effect is obvious, because normally all pointers of unlocked bolts project in the known direction A.

A tamperer is more likely to increase than to reduce the number of bolts locked unless he understands the mechanism. If the tamperer happens to unlock any legitimately locked bolt, he will still fail to release the steering tube unless he not only unlocks all the bolts that were locked, but also escapes the danger of locking other bolts.

To prevent any unauthorized person from knowing which bolts have been locked, the following is the procedure the legitimate user should adopt for locking purposes. First he will select or become aware of the bolts intended to be locked and at that time no bolts should be locked. Secondly the heads 33 of the bolts to be locked will be raised as described, and will be rotated a suitable distance, for example 180°, and will then be lowered on their spindles, so that the indicators 40 will become set out of normal as at B although the spindles will not have been rotated. Then the selected heads 33 are rotated so as to rotate the spindles and at the same time lock the bolts.

This action will bring the indicators from positions B back to positions A so that all the heads 33 appear with their indicators set as if all the bolts were unlocked.

It is an easy matter if the combination is known to rotate the correct heads 33 and so unlock the mechanism. In so unlocking a bolt its indicator takes the B position, and if the user of the car likes to leave any such indicator thus out of normal the head 33 thereof will be ready for rapid locking. But the user can lift and rotate any head 33 to set their indicators into normal positions as at A. It will be evident that the invention is applicable, whether the inner or the outer casing when unlocked is movable relatively to the other, or when each is so movable.

Having described this invention, what is claimed by Letters Patent is:—

1. In keyless locking mechanism, a series of bolts having spindles, each bolt being movable into locked or unlocked position by rotating a head set on the spindle, the head having an indicator, and being movable so that its indicator may be located out of normal position without moving the bolt, and means to further move the head thereby returning the indicator to normal and simultaneously locking the bolt, and means to prevent the indicator being further moved without unlocking the bolt.

2. Keyless locking mechanism having a casing containing bolts each having a spindle carrying a flanged head having an indicator and adapted to be rotated to lock and unlock the bolt, the casing containing another part having one series of recesses to receive such bolts as are locked, and having another series of recesses which will allow the aforesaid flanged heads to be raised and rotated only when all bolts are unlocked.

3. In keyless locking mechanism, two members either or both rotatable relatively to the other except when they are locked together, one member having locking bolts having heads with flanges, and the other member having two series of recesses of equal number spaced around a center the recesses of one series being higher than but not in vertical register with those of the other series, the lower series being adapted to receive locking bolts and the upper series being above the level of the said flanges.

4. In keyless locking mechanism, a series of locking bolts, flexible means for holding each bolt in set positions, and a spindle for each bolt rotatable in one direction and having a ward for releasing the holding means and setting the bolt from one set position to another.

5. In keyless locking mechanism, a bolt having a retaining spring, a bolt-operating spindle rotatable in one direction, and means carried by said spindle for lifting the retaining spring when the bolt is to be projected or retracted.

6. In keyless locking mechanism parts to be locked together, one part having a series of bolts to engage recesses in the other part, the bolts having spindles carrying flanged adjustable heads, the said other part having another series of recesses above the flanges, and adapted to allow the flanges to be raised above them when the bolts are unlocked, the said heads having slotted bases to engage the spindles.

7. In keyless locking mechanism, a casing having a portion thereof separated into a plurality of divisions each marked with a plurality of indicia, a movable member in each of said divisions and carrying a pointer for coöperation with said indicia for indicating locking combinations, a locking bolt adapted to be operated by said movable member, and means for permitting said member to be moved to indicate unlocked position while retaining said bolt locked.

8. In keyless locking mechanism, a casing having locking bolts, a member carried by said casing and adapted to be locked by projecting a series of said bolts, said member having its exterior surface separated into a plurality of divisions, an actuating head in each of said divisions for operating one of said bolts, means for permitting the heads to be raised and rotated without rotating the bolts, and means for holding the heads against being raised when the bolts are locked.

In witness whereof I have hereunto set my hand.

JOHN CUTHBERT DOUGALL.